United States Patent
Ito

(10) Patent No.: US 9,598,047 B2
(45) Date of Patent: Mar. 21, 2017

(54) THROUGH ANCHOR

(71) Applicant: Enshu CO., Ltd, Iwata-shi, Shizuoka (JP)

(72) Inventor: Tadao Ito, Iwata (JP)

(73) Assignee: Enshu Co., Ltd, Itawa-shi, Shizuoka (JP)

( * ) Notice: Subject to any disclaimer, the term of this patent is extended or adjusted under 35 U.S.C. 154(b) by 182 days.

(21) Appl. No.: 14/414,451

(22) PCT Filed: Dec. 18, 2013

(86) PCT No.: PCT/JP2013/083988
§ 371 (c)(1),
(2) Date: Jan. 13, 2015

(87) PCT Pub. No.: WO2015/092893
PCT Pub. Date: Jun. 25, 2015

(65) Prior Publication Data
US 2016/0272148 A1 Sep. 22, 2016

(51) Int. Cl.
*B60R 22/18* (2006.01)
*B60R 22/24* (2006.01)

(52) U.S. Cl.
CPC .............. *B60R 22/18* (2013.01); *B60R 22/24* (2013.01); *B60R 2022/1831* (2013.01)

(58) Field of Classification Search
CPC .. B60R 22/18; B60R 22/12; B60R 2022/1818
See application file for complete search history.

(56) References Cited

U.S. PATENT DOCUMENTS

| | | | | |
|---|---|---|---|---|
| 6,138,328 A | * | 10/2000 | Iseki | B60R 22/24 24/197 |
| 6,467,850 B1 | * | 10/2002 | Kawai | B60R 22/24 29/458 |
| 2004/0227341 A1 | * | 11/2004 | Hattori | B60R 22/24 280/801.1 |

FOREIGN PATENT DOCUMENTS

| | | | |
|---|---|---|---|
| EP | 223582 | 5/1987 | |
| JP | 2007176450 A | * 7/2007 | ............ B60R 22/26 |
| JP | 2013-091446 A | 5/2013 | |

OTHER PUBLICATIONS

English language translation of the following: Office action dated Apr. 21, 2015 from the JPO in a Japanese patent application corresponding to the instant patent application.

* cited by examiner

*Primary Examiner* — Faye M Fleming
(74) *Attorney, Agent, or Firm* — Solaris Intellectual Property Group, PLLC

(57) ABSTRACT

In a through anchor (10), when an occupant is restrained by webbing (30) in a vehicle emergency, the webbing (30) is moved to the vehicle front side in an insertion hole (22) of a guide piece (18) by movement of the occupant due to inertia, and a vehicle front side end face of the webbing (30) contacts a peripheral face of the insertion hole (22) at high load. A gap is formed between the guide piece (18) and an anchor plate (12). The guide piece (18) is accordingly moved to the vehicle front side with respect to the anchor plate (12) by the webbing (30), thereby enabling occurrence of skewing of the webbing (30) toward the vehicle front side in the insertion hole (20) to be suppressed.

4 Claims, 4 Drawing Sheets

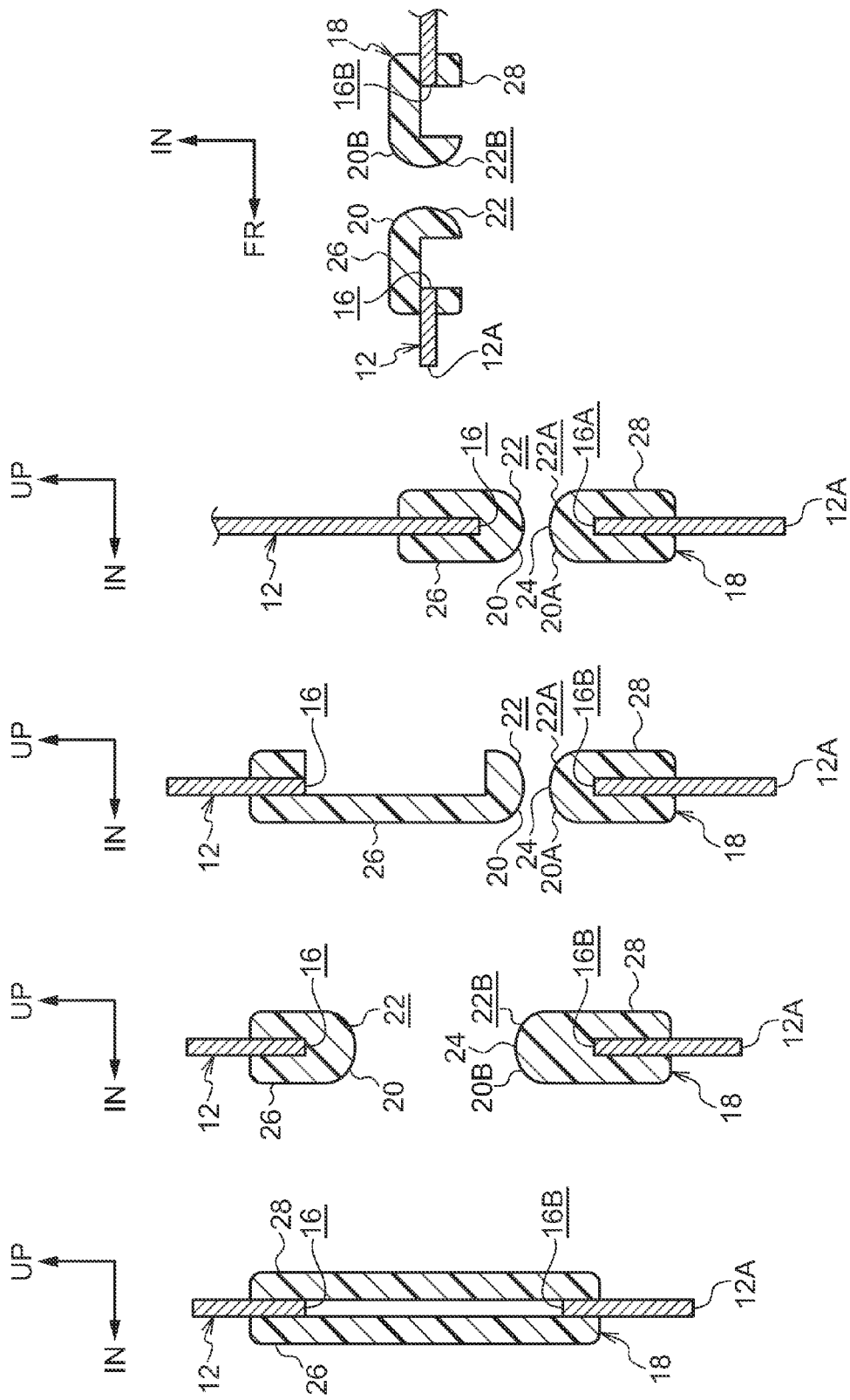

THROUGH ANCHOR

TECHNICAL FIELD

The present invention relates to a through anchor through which webbing applied to a vehicle occupant is inserted.

BACKGROUND ART

In a through anchor disclosed in Japanese Patent Application Laid-Open (JP-A) No. 2013-91446, a webbing insertion hole is formed piercing through a metal plate, and a resin mold portion is fixed to the periphery of the webbing insertion hole of the metal plate. Furthermore, an insertion hole is formed to the resin mold portion, and the webbing is inserted in the length direction through the insertion hole.

It would be preferable to be able to suppress the occurrence of skewing of the webbing toward the width direction in the insertion hole of the through anchor (so-called jamming).

DISCLOSURE OF INVENTION

Technical Problem

In consideration of the above circumstances, an object of the present invention is to obtain a through anchor capable of suppressing the occurrence of skewing of the webbing toward the width direction in the insertion hole.

Solution to Problem

A through anchor of a first aspect of the present invention includes: a main body member formed with a through hole; and a slide support member that is attached to a periphery of the through hole of the main body member, that is formed with an insertion hole through which a webbing that is applied to a vehicle occupant is inserted in a length direction of the webbing such that the webbing is slidably supported, and that is movable in a webbing width direction with respect to the main body member.

A through anchor of a second aspect of the present invention is the through anchor of the first aspect of the present invention, further including an insertion portion that is provided at the slide support member and formed with an insertion hole, wherein a gap is provided in the webbing width direction between the insertion portion and a peripheral face of the insertion through hole.

A through anchor of a third aspect of the present invention is the through anchor of the first aspect or the second aspect of the present invention, wherein the main body member anchors movement of the slide support member in a webbing thickness direction with respect to the main body member.

A through anchor of a fourth aspect of the present invention is the through anchor of any one of the first aspect to the third aspect of the present invention, further including an anchor portion that is provided at the slide support member, that is anchored to the main body member, and that anchors movement of the slide support member in the webbing length direction with respect to the main body member.

Advantageous Effects of Invention

In the through anchor of the first aspect of the present invention, the main body member is formed with the through hole, and the slide support member is attached to the periphery of the through hole of the main body member. Furthermore, the slide support member is formed with the insertion hole, the webbing that is applied to the vehicle occupant is inserted through the insertion hole in the length direction of the webbing such that the slide support member slidably supports the webbing.

The slide support member is configured movable in the webbing width direction with respect to the main body member. The slide support member is accordingly moved by the webbing in the webbing width direction with respect to the main body member, enabling the movement range of the webbing in the width direction to be increased, and enabling the occurrence of skewing of the webbing toward the width direction in the insertion hole to be suppressed.

In the through anchor of the second aspect of the present invention, the insertion portion is provided at the slide support member, and the insertion portion is formed with the insertion hole.

The gap is provided in the webbing width direction between the insertion portion and the peripheral face of the through hole. This enables movement of the insertion portion in the webbing width direction with respect to the through hole, enabling movement of the slide support member in the webbing width direction with respect to the main body member.

In the through anchor of the third aspect of the present invention, the main body member anchors movement of the slide support member in the webbing thickness direction. Thus when the slide support member is moved in the webbing width direction with respect to the main body member, movement of the slide support member in the webbing thickness direction with respect to the main body member can be anchored, enabling the slide support member to move smoothly in the webbing width direction with respect to the main body member.

In the through anchor of the fourth aspect of the present invention, the anchor portion provided at the slide support member is anchored to the main body member, anchoring movement of the slide support member in the webbing length direction with respect to the main body member. Thus when the slide support member is moved in the webbing width direction with respect to the main body member, movement of the slide support member in the webbing length direction with respect to the main body member can be anchored, enabling the slide support member to move smoothly in the webbing width direction with respect to the main body member.

BRIEF DESCRIPTION OF DRAWINGS

FIG. 3A is a cross-section view (cross-section view of line A-A in FIG. 2A) illustrating the through anchor according to the exemplary embodiment of the present invention.

FIG. 3B is a cross-section view (cross-section view of line B-B in FIG. 2A) illustrating the through anchor according to the exemplary embodiment of the present invention.

FIG. 3C is a cross-section view (cross-section view of line C-C in FIG. 2A) illustrating the through anchor according to the exemplary embodiment of the present invention.

FIG. 3D is a cross-section view (cross-section view of line D-D in FIG. 2A) illustrating the through anchor according to the exemplary embodiment of the present invention.

FIG. 3E is a cross-section view (cross-section view of line E-E in FIG. 2A) illustrating the through anchor according to the exemplary embodiment of the present invention.

BEST MODE FOR CARRYING OUT THE INVENTION

Figure 1:
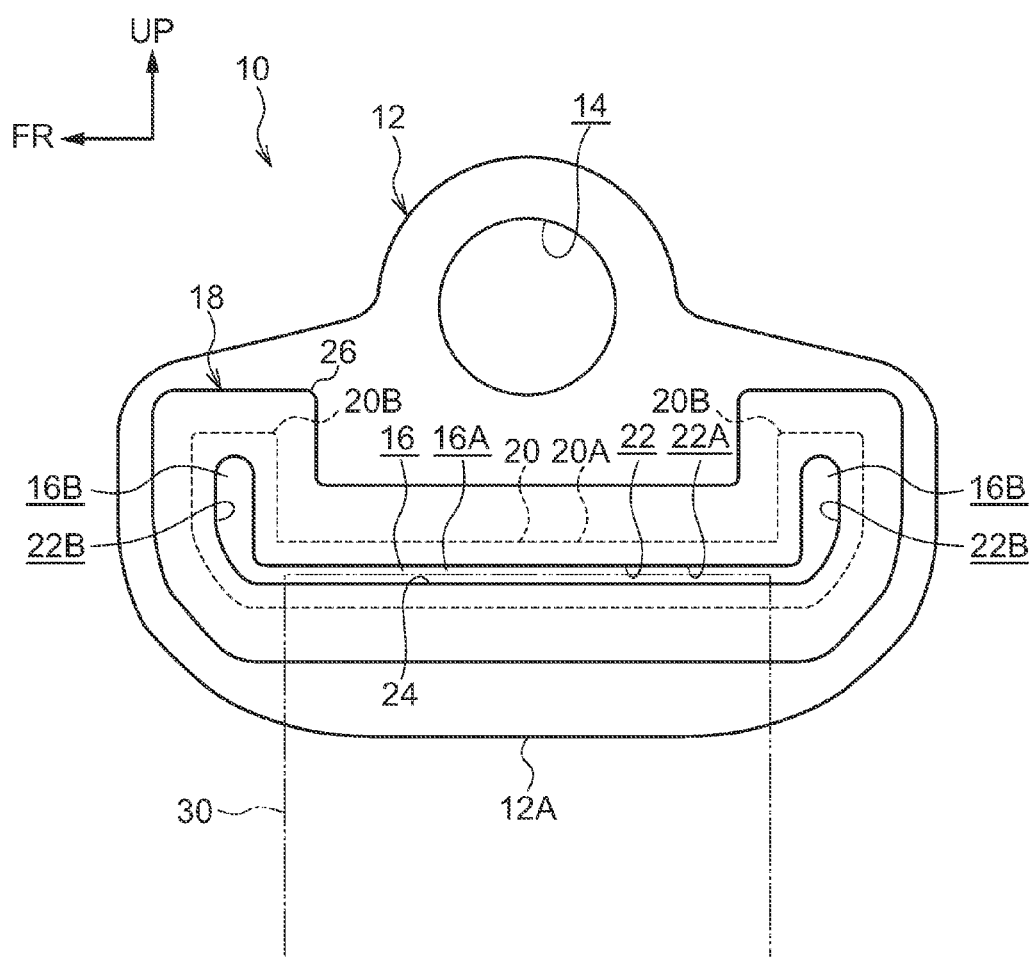
FIG. 1 is a face-on view illustrating a through anchor according to an exemplary embodiment of the present invention, in a vehicle-attached state as viewed from the vehicle width direction inside.
Figure 2A:
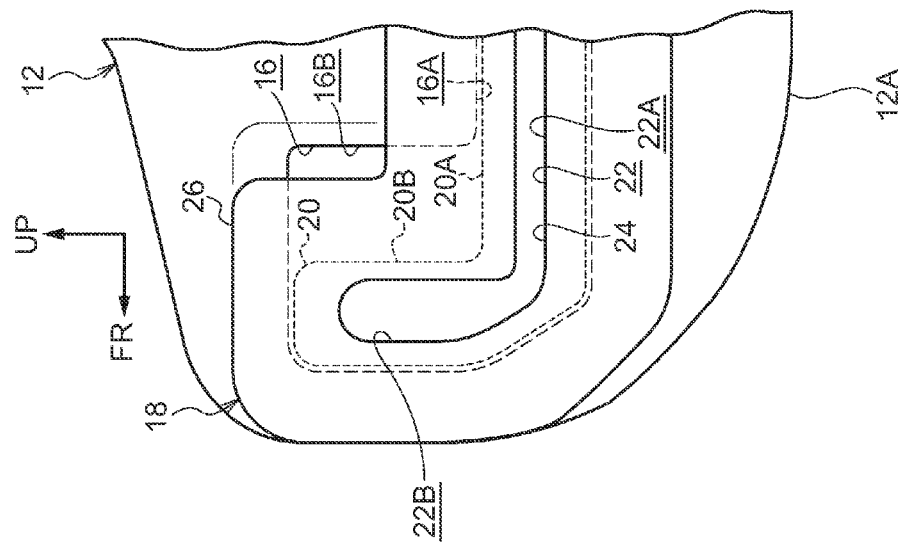
FIG. 2A is a face-on view illustrating a relevant portion of the through anchor according to the exemplary embodiment of the present invention, in the vehicle-attached state as viewed from the vehicle width direction inside.

FIG. 1 is a face-on view of a through anchor 10 (the webbing hanger) according to an exemplary embodiment of the present invention, in a vehicle-attached state as viewed from the vehicle width direction inside. FIG. 2A is a face-on view of a relevant portion of the through anchor 10, in the vehicle-attached state as viewed from the vehicle width direction inside. Note that, in the drawings, the arrow FR indicates the vehicle front, the arrow IN indicates the vehicle width direction inside, and the arrow UP indicates upward when the through anchor 10 is attached to a vehicle.

The through anchor 10 according to the present exemplary embodiment is employed in what is referred to as a three-point seatbelt device as a so-called slip joint (shoulder anchor). The through anchor 10 is disposed at the vehicle width direction outside and the vehicle rear side of a vehicle body upper portion of a seat (not illustrated in the drawings) for seating an occupant in a vehicle (automobile).

Figure 4:
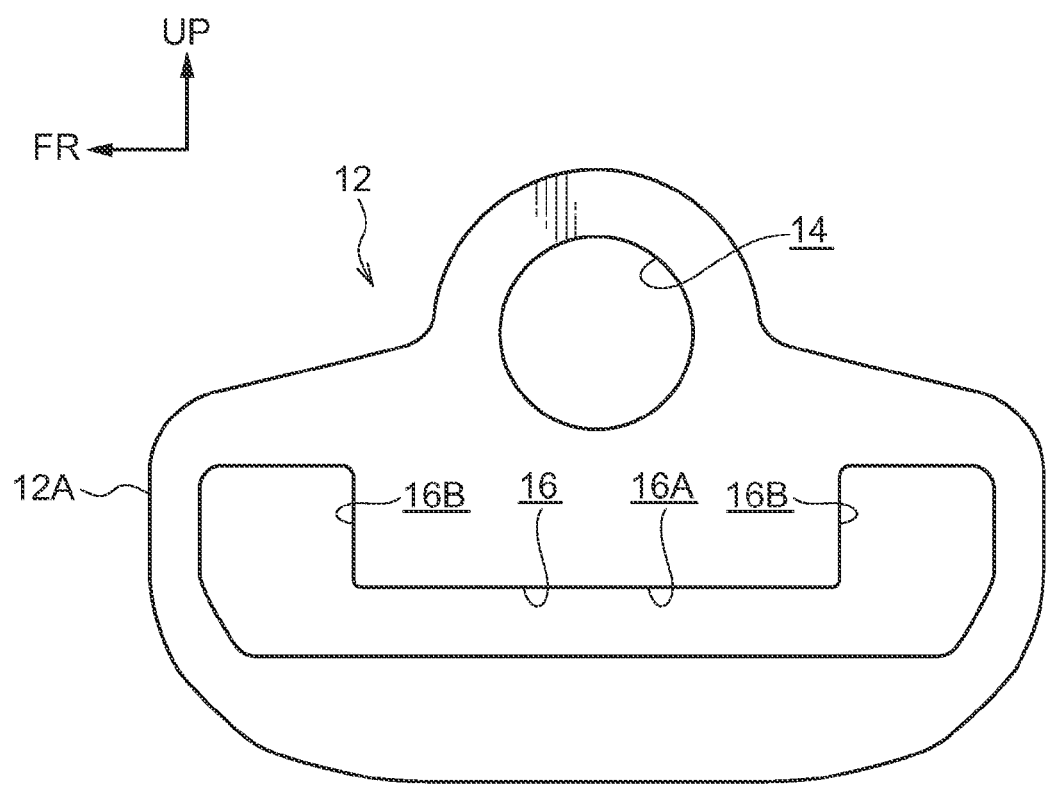
FIG. 4 is a face-on view illustrating an anchor plate of the through anchor according to the exemplary embodiment of the present invention, in the vehicle-attached state as viewed from the vehicle width direction inside.

As illustrated in FIG. 1 and FIG. 2A, the through anchor 10 includes a metal (steel material) plate shaped anchor plate 12 (see FIG. 4) as a main body member (strength member). The anchor plate 12 is manufactured by punch press working.

A circular shaped fixing hole 14 serving as an attachment portion is formed piercing through an upper portion of the anchor plate 12, and the anchor plate 12 is fixed (attached) to the vehicle body by a bolt (not illustrated in the drawings) fitted through the fixing hole 14. As a result, the through anchor 10 is capable of swinging in the vehicle front-rear direction about the bolt.

A through hole 16, configured as a U shape viewed from the vehicle width direction, is formed piercing through an up-down direction intermediate portion of the anchor plate 12. A vehicle front-rear direction center portion of the through hole 16 configures an elongated rectangular shaped central through hole 16A, and the central through hole 16A extends in the vehicle front-rear direction. Substantially rectangular shaped end through holes 16B are configured at a vehicle front side end portion and a vehicle rear side end portion of the through hole 16, respectively. The end through holes 16B communicate with the central through hole 16A in the vehicle front-rear direction, and extend upward (in an orthogonal (intersecting) direction) with respect to the central through hole 16A.

A guide piece 18, configured in resin as a U shape viewed from the vehicle width direction and serving as a slide support member, is attached around the entire periphery of the through hole 16 of the anchor plate 12, at an up-down direction intermediate portion of the anchor plate 12. The guide piece 18 only covers the vicinity of the entire periphery of the through hole 16 of the anchor plate 12, and the guide piece 18 does not cover the entire body of an outer peripheral edge face 12A of the anchor plate 12.

An insertion portion 20, configured as a U shape viewed from the vehicle width direction, is provided at the guide piece 18, and the insertion portion 20 is disposed inside the through hole 16. A vehicle front-rear direction center portion of the insertion portion 20 configures an elongated rectangular column shaped central insertion portion 20A, and the central insertion portion 20A extends in the vehicle front-rear direction. Substantially rectangular column shaped end insertion portions 20B are configured at a vehicle front side end portion and a vehicle rear side end portion of the insertion portion 20. The end insertion portions 20B are connected to the central insertion portion 20A in the vehicle front-rear direction, and extend upward (in an orthogonal (intersecting) direction) with respect to the central insertion portion 20A.

The central insertion portion 20A is fitted in the up-down direction inside the central through hole 16A of the through hole 16 (see FIG. 3D), and an up-down direction clearance between the central insertion portion 20A and an inner peripheral face of the central through hole 16A is set as a required minimum in consideration of design and manufacturing variations (set as zero when manufacturing restrictions are in place).

The end insertion portions 20B are fitted in the up-down direction inside the respective end through holes 16B of the through hole 16 (see FIG. 3B), and an up-down direction clearance between the respective end insertion portions 20B and inner peripheral faces of the end through holes 16B is set as a required minimum in consideration of design and manufacturing variations (set as zero when manufacturing restrictions are in place).

The central insertion portion 20A is anchored in the up-down direction at the inner peripheral face of the central through hole 16A, and the end insertion portions 20B are anchored in the up-down direction at the respective inner peripheral faces of the end through holes 16B, thereby anchoring up-down direction movement of the guide piece 18 with respect to the anchor plate 12.

A gap is formed in the vehicle front-rear direction (see FIG. 3E) between a vehicle front side end face of the end insertion portion 20B and a vehicle front side end face of the end through hole 16B, and between a vehicle rear side end face of the end insertion portion 20B and a vehicle rear side end face of the end through hole 16B, respectively. The vehicle front-rear direction dimensions of the respective gaps between the vehicle front side end face of the end insertion portion 20B and the vehicle front side end face of the end through hole 16B, and the vehicle rear side end face of the end insertion portion 20B and the vehicle rear side end face of the end through hole 16B, are set to be the same as each other.

An insertion hole 22, configured as a U shape viewed from the vehicle width direction, is formed piercing through the insertion portion 20, and the insertion hole 22 is configured as smaller than, and substantially similarly shaped to, the through hole 16. A vehicle front-rear direction center portion of the insertion hole 22 configures a central insertion hole 22A, and the central insertion hole 22A extends in the vehicle front-rear direction. End insertion holes 22B are configured at a vehicle front side end portion and a vehicle rear side end portion of the insertion hole 22, and the end insertion holes 22B are connected to the central insertion hole 22A in the vehicle front-rear direction, and extend upward (in an orthogonal (intersecting) direction) with respect to the central insertion hole 22A.

A lower side face of the insertion hole 22 configures a slide face 24 (support face) (see FIG. 3C and FIG. 3D), and the slide face 24 is curved in a substantially semi-circular arc cross-section convex shape, as viewed from the vehicle front-rear direction.

A front wall 26 and a back wall 28, each configured in a flat plate shape and serving as an anchor portion, are provided at a vehicle width direction inside portion and a vehicle width direction outside portion of the guide piece 18, respectively (see FIG. 3A to FIG. 3E). The front wall 26 and the back wall 28 are integrally formed to the insertion portion 20, and the vehicle width direction inside face of the front wall 26 is in the same plane as the vehicle width direction inside face of the insertion portion 20, and the vehicle width direction outside face of the back wall 28 is in the same plane as the vehicle width direction outside face of the insertion portion 20. The outer peripheries of the front wall 26 and the back wall 28 configure the outer periphery of the guide piece 18. The front wall 26 covers the through hole 16 of the anchor plate 12 and the entire peripheral direction edge portion of the through hole 16 from the vehicle width direction inside, and the back wall 28 covers the through hole 16 of the anchor plate 12 and the entire peripheral direction edge portion of the through hole 16 from the vehicle width direction outside. The entire peripheral direction edge portion of the through hole 16 of the anchor plate 12 is sandwiched between the front wall 26 and the back wall 28, and the front wall 26 and the back wall 28 are thereby anchored to the anchor plate 12, anchoring movement of the guide piece 18 in the vehicle width direction with respect to the anchor plate 12.

The guide piece 18 is, for example, fixed to the anchor plate 12 at the front wall 26 and the back wall 28, thereby restricting vehicle front-rear direction movement of the guide piece 18 with respect to the anchor plate 12.

An elongated belt shaped webbing 30 is inserted through (fed through) the central insertion hole 22A (the central through hole 16A of the through hole 16) of the insertion hole 22 of the guide piece 18 (the insertion portion 20), so as to be movable in the length direction of the webbing. A base end side of the webbing 30, further to the vehicle width direction outside (vehicle outside) than the insertion hole 22, extends to the lower side of the through anchor 10, and is taken up on a take-up device (not illustrated in the drawings). The take-up device is fixed to the vehicle width direction outside and lower side of the seat for seating an occupant, and biases the webbing 30 in a take-up direction. A leading end side of the webbing 30, further to the vehicle width direction inside (vehicle interior side) than the insertion hole 22, extends to the lower side of the through anchor 10, and is fixed to the vehicle width direction outside and lower side of the seat. As a result, the webbing 30 contacts the slide face 24 of the insertion hole 22 and is supported (hangs) in a folded state due to the biasing force of the take-up device, such that the webbing 30 slides over and is guided by the slide face 24 when the webbing 30 moves in the length direction of the webbing with respect to the insertion hole 22.

The leading end side of the webbing 30 beyond the through anchor 10 (the insertion hole 22) is inserted through a tongue (not illustrated in the drawings) and the tongue is configured movable along the length direction of the webbing 30. A buckle (not illustrated in the drawings) is attached to the vehicle width direction inside and lower side of the seat, and the webbing 30 is applied to an occupant seated in the seat (not illustrated in the drawings) by pulling the webbing 30 out from the take-up device against the biasing force, and engaging the tongue in the buckle.

When the webbing 30 is applied to the occupant, the leading end side of the webbing 30 beyond the through anchor 10 (the insertion hole 22) extends from the through anchor 10 toward the vehicle front diagonal downward side, and the through anchor 10 swings toward the vehicle front side. Furthermore, extraction of the webbing 30 from the take-up device is locked by the take-up device in the event of a vehicle emergency (such as a collision).

Explanation follows regarding operation of the exemplary embodiment.

In the through anchor 10 with the above-described configuration, the guide piece 18 is attached to the entire periphery of the through hole 16 of the anchor plate 12, the webbing 30 is movably inserted along the length direction through the insertion hole 22 (central insertion hole 22A) of the guide piece 18 (insertion portion 20), and the webbing 30 is slidably supported by the slide face 24 of the guide piece 18.

In the event of a vehicle emergency (such as a collision), extraction of the webbing 30 applied to the occupant from the take-up device is locked by the take-up device, and the occupant is restrained by the webbing 30. In such an event, due to movement of the occupant under inertia, the webbing 30 is moved to the vehicle front side (one width direction side of the webbing 30) of the insertion hole 22 (the central insertion hole 22A and the vehicle front side end insertion hole 22B), and the vehicle front side end face (one width direction side end face) of the webbing 30 contacts the vehicle front side end face of the vehicle front side insertion hole 22B at high load.

Figure 2B:
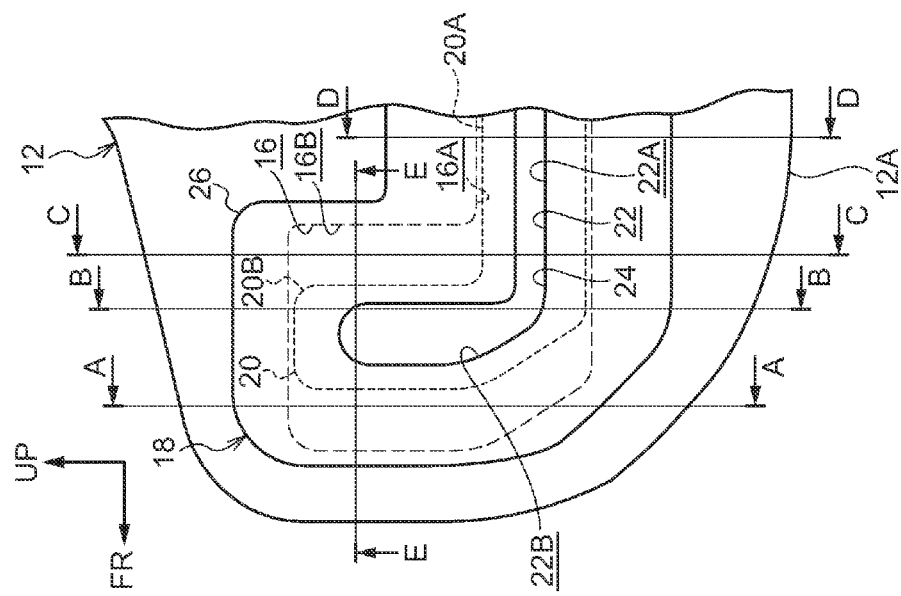
FIG. 2B is a face-on view illustrating a guide piece of the through anchor according to the exemplary embodiment of the present invention that has moved with respect to an anchor plate, in the vehicle-attached state as viewed from the vehicle width direction inside.

When this occurs, the gap formed in the vehicle front-rear direction between the vehicle front side end face of the end insertion portion 20B of the guide piece 18 (insertion portion 20) and the vehicle front side end face of the end through hole 16B of the anchor plate 12 (through hole 16) enables movement of the insertion portion 20 to the vehicle front side with respect to the through hole 16, enabling movement of the guide piece 18 toward the vehicle front side with respect to the anchor plate 12. As a result, when the vehicle front side end face of the webbing 30 contacts the vehicle front side end face of the vehicle front side end insertion hole 22B of the guide piece 18 at high load, as described above, fixture of the guide piece 18 to the anchor plate 12 is released by the webbing 30, and the guide piece 18 is moved to the vehicle front side with respect to the anchor plate 12 (see FIG. 2B). This enables the range of movement of the webbing 30 toward the vehicle front side to be increased, enabling occurrence of skewing of the webbing 30 in the insertion hole 22 toward the vehicle front side (so-called jamming) to be suppressed.

Moreover, the central insertion portion 20A of the guide piece 18 (the insertion portion 20) is anchored in the up-down direction (the webbing 30 thickness direction) at the inner peripheral face of the central through hole 16A of the anchor plate 12 (the through hole 16), and the end insertion portions 20B of the guide piece 18 (the insertion portion 20) are anchored in the up-down direction to the respective inner peripheral faces of the end through holes 16B of the anchor plate 12 (the through hole 16), anchoring movement of the guide piece 18 in the up-down direction with respect to the anchor plate 12. As a result, when the guide piece 18 is moved toward the vehicle front side with respect to the anchor plate 12 by the webbing 30, as described above, movement of the guide piece 18 in the up-down direction with respect to the anchor plate 12 can be anchored, enabling the guide piece 18 to move smoothly to the vehicle front side with respect to the anchor plate 12. This enables the movement range of the webbing 30 to the vehicle front side to be effectively increased, enabling occurrence of skewing of the webbing 30 in the insertion hole 22 toward the vehicle front side (so-called jamming) to be effectively suppressed.

Furthermore, the front wall 26 and the back wall 28 of the guide piece 18 are anchored to the anchor plate 12, anchoring movement of the guide piece 18 with respect to the anchor plate 12 in the vehicle width direction (the webbing 30 length direction). As a result, when the guide piece 18 is moved to the vehicle front side with respect to the anchor plate 12 by the webbing 30, as described above, movement of the guide piece 18 in the vehicle width direction with respect to the anchor plate 12 can be anchored, enabling the guide piece 18 to move even more smoothly to the vehicle front side with respect to the anchor plate 12. This enables the movement range of the webbing 30 to the vehicle front side to be even more effectively increased, enabling occurrence of skewing of the webbing 30 to the vehicle front side in the insertion hole 22 (so-called jamming) to be still more effectively suppressed.

Note that the through anchor 10 is applied to a slip joint in the exemplary embodiment. However, the through anchor 10 may also be applied to a tongue.

EXPLANATION OF REFERENCE NUMERALS

10 through anchor
12 anchor plate (main body member)
16 through hole
18 guide piece (slide support member)
20 insertion portion
22 insertion hole
26 front wall (anchor portion)
28 back wall (anchor portion)
30 webbing

The invention claimed is:

1. A through anchor comprising:
   a main body member formed with a through hole; and
   a slide support member that is fixed to a periphery of the through hole of the main body member, that is formed with an insertion hole through which a webbing that is applied to a vehicle occupant is inserted in a length direction of the webbing such that the webbing is slidably supported, and that is movable in a webbing width direction with respect to the main body member due to load of the vehicle occupant being applied to the slide support member by the webbing and fixture of the slide support member to the main body member being released in an event of a vehicle collision.

2. The through anchor of claim 1, further comprising an insertion portion that is provided at the slide support member and formed with an insertion hole, wherein a gap is provided in the webbing width direction between the insertion portion and a peripheral face of the through hole.

3. The through anchor of claim 1, wherein:
   the main body member anchors movement of the slide support member in a webbing thickness direction with respect to the main body member.

4. The through anchor of claim 1, further comprising an anchor portion that is provided at the slide support member, that is anchored to the main body member, and that anchors movement of the slide support member in the webbing length direction with respect to the main body member.

* * * * *